(12) United States Patent
Phua et al.

(10) Patent No.: US 11,528,529 B1
(45) Date of Patent: Dec. 13, 2022

(54) DEVICE, METHOD AND SYSTEM FOR CHANGING CONTENT OF LIVE BROADCAST MEDIA

(71) Applicant: MOTOROLA SOLUTIONS, INC., Chicago, IL (US)

(72) Inventors: Jin Hoe Phua, Penang (MY); Wei Hong Tew, Penang (MY); Chee Kit Chan, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/492,128

(22) Filed: Oct. 1, 2021

(51) Int. Cl.
*H04N 21/44* (2011.01)
*H04N 21/2187* (2011.01)
*H04N 21/414* (2011.01)
*H04N 21/4223* (2011.01)
*G06V 40/16* (2022.01)

(52) U.S. Cl.
CPC ..... *H04N 21/44008* (2013.01); *G06V 40/172* (2022.01); *H04N 21/2187* (2013.01); *H04N 21/41415* (2013.01); *H04N 21/4223* (2013.01)

(58) Field of Classification Search
CPC ......... H04N 21/44008; H04N 21/2187; H04N 21/41415; H04N 21/4223; G06V 40/172
See application file for complete search history.

(56) References Cited

U.S. PATENT DOCUMENTS

| 9,483,732 | B1 | 11/2016 | Milakovich | |
|---|---|---|---|---|
| 2017/0161614 | A1 | 7/2017 | Mehta et al. | |
| 2017/0308812 | A1 | 10/2017 | Kaisser | |
| 2019/0268572 | A1* | 8/2019 | Tsukahara | H04N 7/181 |
| 2021/0076102 | A1 | 3/2021 | Patel | |
| 2021/0350116 | A1* | 11/2021 | Shixing | G06V 10/771 |

* cited by examiner

*Primary Examiner* — Nnenna N Ekpo

(74) *Attorney, Agent, or Firm* — Perry + Currier, Inc.

(57) ABSTRACT

A device, method and system for changing content of live broadcast media is provided. The device associated with a given location, and analyzes live broadcast media to determine presence of one or more of a person of interest (POI) and an event of interest (EOI), the live broadcast media being provided at one or more display screens at the given location, the live broadcast media originating external to the given location. The device analyzes one or more images captured by one or more cameras located at the given location to determine whether one or more of the POI and the EOI meets a condition for causing harm to one or more persons indicated in the one or more images. The device, responsive to the POI or the EOI meeting the condition, changes content of the live broadcast media.

18 Claims, 5 Drawing Sheets

DEVICE, METHOD AND SYSTEM FOR CHANGING CONTENT OF LIVE BROADCAST MEDIA

BACKGROUND OF THE INVENTION

Certain locations, such as airports, train stations, bars, restaurants, malls and the like, may be crowded, and further may include display screens, on which live broadcast media, such as news, is being provided. Certain images in the live broadcast media may result in persons at the location behaving in a manner that may cause harm to other persons at the location.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
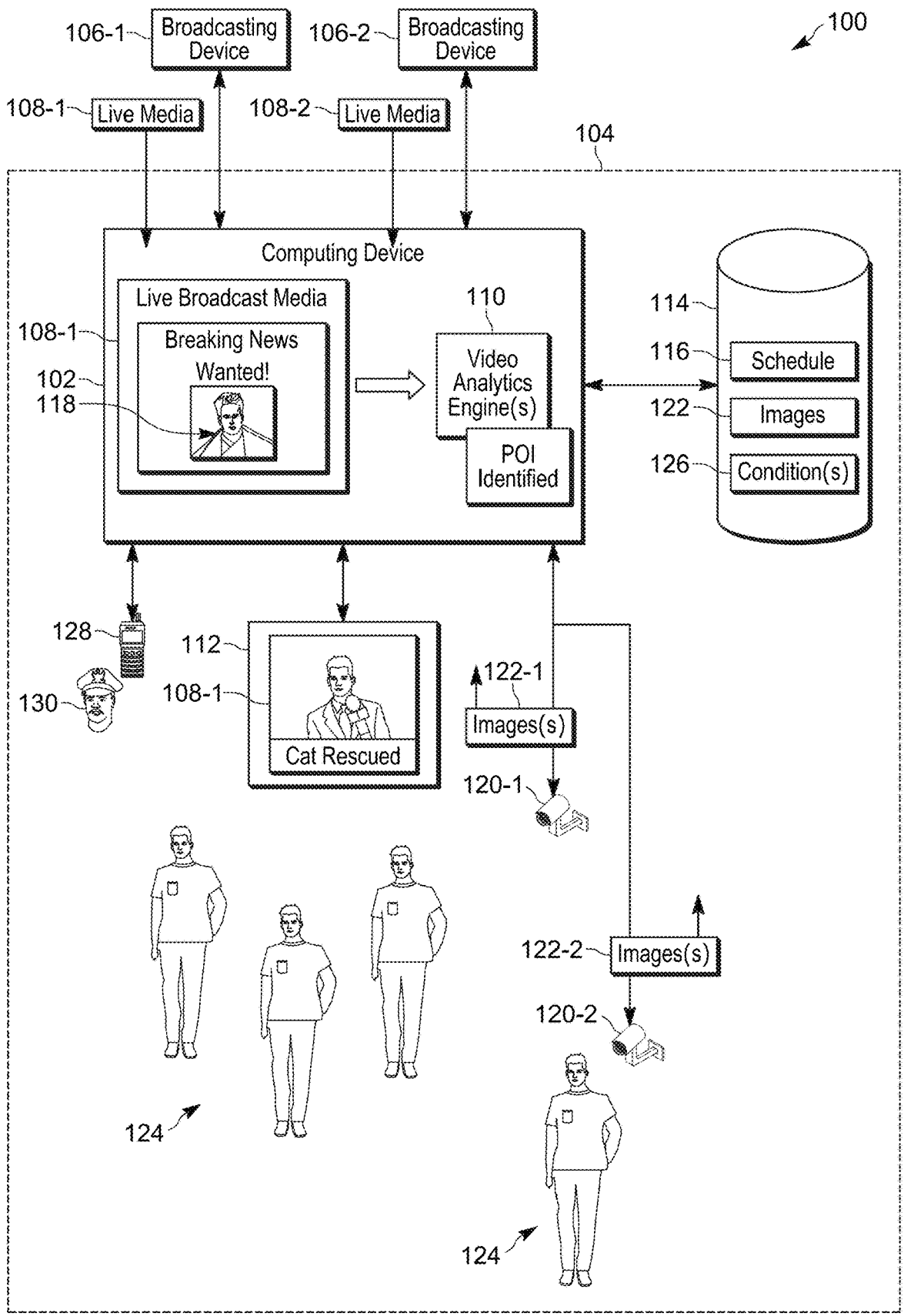
FIG. 1 is a system for changing content of live broadcast media, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Certain locations, such as airports, train stations, bars, restaurants, malls and the like, may be crowded and further may include display screens, on which live broadcast media, such as news, is being provided. Certain images in the live broadcast media may result in persons at the location behaving in a manner that may cause harm to other persons at the location. Thus, there exists a need for an improved technical method, device, and system for changing content of live broadcast media, for example to reduce a likelihood of preventing harm to persons at a location.

Hence, provided herein is a computing device associated with a given location, and which may be in communication with broadcasting devices that provide live broadcast media. The computing device may further be in communication with one or more display screens at the given location, at which the live broadcast media is provided. The computing device may further be in communication with one or more cameras at the given location, which capture images of persons at the given location; the images may be stored at a database, and the like. The computing device may analyze the live broadcast media to determine presence of a person of interest (POI) and/or an event of interest (EOI) in the live broadcast media. The computing device may further analyze one or more images captured by the one or more cameras (e.g., live images and/or stored images) to determine whether one or more of the POI and the EOI meets a condition for causing harm to one or more persons indicated in the one or more images.

In a particular example, the live broadcast media provided at the display screens may include breaking news that includes a face of a wanted suspect (e.g., a POI), and the condition may comprise a respective face in the images captured by the cameras meeting a match threshold with the face in the live broadcast media. In such a scenario, the person in the images, whose face meets the match threshold, may be in danger of others, who are watching the breaking news, physically restraining the person as the others may believe the person is the wanted suspect, and such physical restraint may cause harm to the person. Such physical restraint (e.g., a citizen's arrest) may be particularly harmful when the person merely looks similar to the wanted suspect (e.g., in instances of mistaken identity).

In another particular example, the live broadcast media provided at the display screens may include breaking news that shows a natural disaster (e.g., an EOI) with graphic and/or violent scenes. In these examples, the condition may comprise a rule that associates given events, such as the natural disaster, in the live broadcast media with given demographics of the one or persons in the one or more images, such as the persons being school age and/or children of a given age group. In such a scenario, graphic and/or violent scenes may upset the children, which may cause them harm.

As such, it is understood that the computing device is generally configured to analyze images and/or video using, for example, any suitable video analytics, which may be implemented using a video analytic engine, and the like.

The computing device, in response to the POI and/or the EOI meeting a condition, may change content of the live broadcast media. For example, the live broadcast media may be replaced with a notice (e.g., an image) indicating that the live broadcast media is "Unavailable", and the like, and/or the computing device may change from a first channel, at which the POI and/or the EOI occurred, to a second channel (e.g., to other live broadcast media), and the like. The computing device may continue to monitor the live broadcast media and when the condition is no longer being met, the computing device may reverse the change of the content of the live broadcast media; for example, an image of "Unavailable" may be removed, and/or computing device may change from the second channel back to the first channel.

An aspect of the present specification provides a method comprising: analyzing, at a computing device associated with a given location, live broadcast media to determine presence of one or more of a person of interest (POI) and an event of interest (EOI), the live broadcast media being provided at one or more display screens at the given location, the live broadcast media originating external to the given location; analyzing, at the computing device, one or more images captured by one or more cameras located at the given location to determine whether one or more of the POI and the EOI meets a condition for causing harm to one or more persons indicated in the one or more images; and responsive to the POI or the EOI meeting the condition, changing, at the computing device, content of the live broadcast media.

Another aspect of the present specification provides a device associated with a given location, the device comprising: a communication unit; and a controller configured to: analyze live broadcast media, received via the communication unit, to determine presence of one or more of a person of interest (POI) and an event of interest (EOI), the live broadcast media being provided at one or more display screens at the given location, the live broadcast media originating external to the given location; analyze one or more images, received via the communication unit, captured by one or more cameras located at the given location to determine whether one or more of the POI and the EOI meets a condition for causing harm to one or more persons indicated in the one or more images; and responsive to the POI or the EOI meeting the condition, change content of the live broadcast media.

Each of the above-mentioned aspects will be discussed in more detail below, starting with example system and device architectures of the system, in which the embodiments may be practiced, followed by an illustration of processing blocks for achieving an improved technical method, device, and system for changing content of live broadcast media.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for changing content of live broadcast media. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks.

Herein, reference will be made to engines, such as video analytics engines, which may be understood to refer to hardware, and/or a combination of hardware and software (e.g., a combination of hardware and software includes software hosted at hardware, such as a software module that is stored at a processor-readable memory implemented or interpreted by a processor), or hardware and software hosted at hardware and/or implemented as a system-on-chip architecture and the like.

The system 100 comprises a computing device 102, which is associated with a given location 104, such as an airport, a train station, a bus station, a mall, a bar, a restaurant and/or any other suitable location. While the computing device 102 is depicted as being located at the given location 104, the computing device 102 may be located "in the cloud" and/or at any suitable other location, but the computing device 102 may be to provide certain technical features and/or services for the given location 104, as described herein. The given location 104 is hence indicated using dashed lines to indicate that the computing device 102, and/or other components described herein as being associated with the given location 104, may not strictly be located inside the given location 104, unless described herein.

Furthermore, while the computing device 102 is depicted as a single computing device 102, the computing device 102 may comprise one or more computing devices with functionality described herein with respect to the computing device 102 being distributed among the one or more computing devices (e.g., in a cloud based environment).

The computing device 102 is further in communication with broadcasting devices 106-1, 106-2 that are external to the given location 104. The computing device 102 is receiving respective live broadcast media 108-1, 108-2 from the broadcasting devices 106-1, 106-2. The broadcasting devices 106-1, 106-2 are interchangeably referred to hereafter, collectively, as the broadcasting devices 106 and, generically, as a broadcasting device 106. This convention may be used elsewhere in the present specification. For example, the live broadcast media 108-1, 108-2 may be referred to as the live broadcast media 108 and/or live broadcast media 108.

In general, the broadcasting devices 106 may comprise any suitable devices operated by a television service provider and/or an internet service provider, and the like, and which provide live broadcast media 108, which may include, but is not limited to, television channels, internet channels, news channels, sports channels, and/or any other suitable channels and/or live broadcast media. It is understood, however, that the live broadcast media 108 is generally provided in a "push" environment such that the content thereof is not generated upon request but is rather generated (e.g., at a studio and/or broadcasting center) and pushed and/or broadcast, for example in a channel format, and may be received at the computing device 102 "over the air" (e.g., via antennas), and/or via cable (e.g., via a cable channel provider), and the like.

As such, while two broadcasting devices 106 are depicted, the system 100 may comprise one broadcasting device 106, which provides a plurality of live broadcast media 108 in the form of channels, or the system 100 may comprise more than two broadcasting devices 106 that provide one or more respective live broadcast media 108. Similarly, while the computing device 102 is depicted as receiving two live broadcast media 108, the computing device 102 may be receiving as few as one live broadcast media 108, or the computing device 102 may be receiving more than two live broadcast media 108.

However, as depicted, the live broadcast media 108-1 may comprise a first channel provided by the broadcasting device 106-1 and the live broadcast media 108-2 may comprise a second channel provided by the broadcasting device 106-2.

Furthermore, as depicted, the computing device 102 may comprise a video analytics engine 110, which may analyze the live broadcast media 108 to determine to presence of one or more of a person of interest (POI) and an event of interest (EOI) in the live broadcast media 108. For example, as depicted, the video analytics engine 110 is analyzing the live broadcast media 108-1 (e.g., as indicated by a large arrow therebetween).

As depicted, the system 100 further comprises one or more display screens 112 at the given location 104. While one display screen 112 is depicted, it is understood that more than one display screen 112 may be located at the given location 104. Furthermore while as depicted, the display screen 112 is providing the first channel of the live broadcast media 108-1, other display screens 112 (not depicted) may be providing the first channel of the live broadcast media 108-1, or other channels of other live broadcast media 108, such as the second channel of the live broadcast media 108-2.

Furthermore, as depicted, the system 100 may further comprise at least one memory 114, for example in the form of a database, and the like. The computing device 102 may be in communication with the at least one memory 114, and the at least one memory 114 may optionally store a schedule 116 of the live broadcast media 108. For example, on channels of the live broadcast media 108, "shows" and the like may be broadcast at different times (e.g., similar to television stations broadcasting shows), and the schedule 116 may indicate which shows are being broadcast on respective channels of the live broadcast media 108. For example, the schedule 116 may indicate that, for given time periods, news shows are broadcast on channels of the live broadcast media 108.

While the schedule 116 is depicted as being stored at the at least one memory 114, it is understood that the schedule 116 may be received, and/or received dynamically and/or updated dynamically, by one or more of the broadcasting devices 106.

Furthermore, as depicted, the computing device 102 may be distributing the first channel of the live broadcast media 108-1 to the display screen 112. In some examples, as depicted, the computing device 102 may be distributing the first channel of the live broadcast media 108-1 to the display screen 112, but on a delay (e.g., a time delay). For example, the live broadcast media 108-1 depicted as being analyzed by the video analytics engine 110, and the live broadcast media 108-1 being provided by the display screen 112, are understood to be from the first channel of the live broadcast media 108-1, but respective content is depicted as being different. However, it is understood that the live broadcast media 108-1 is on a time delay such that the video analytics engine 110 analyzes the live broadcast media 108-1 before the live broadcast media 108-1 is provided at the display screen 112. Hence, it is understood that the live broadcast media 108-1 depicted as being analyzed by the video analytics engine 110, follows, in time, the live broadcast media 108-1 being provided by the display screen 112. For example, the live broadcast media 108-1 being provided at the display screen 112 shows a reporter of a news broadcast reporting on a rescue of a cat, while the live broadcast media 108-1 being analyzed by the video analytics engine 110 at the computing device 102 shows breaking news of a wanted suspect, as well as a face 118 of the wanted suspect.

As depicted, the system 100 further comprises one or more cameras 120-1, 120-2 (e.g., the cameras 120 and/or a camera 120) located at the given location 104. The camera 120-1 is generally capturing images 122-1 and providing the images 122-1 to the computing device 102; similarly, the camera 120-2 is generally capturing images 122-2 and providing the images 122-2 to the computing device 102. The images 122-1, 122-2 (e.g., the images 122 and/or an image 122) may be in the form of video and/or a plurality of images, and the like. The computing device 102 may store (e.g., at least temporarily and/or for a given time period) the images 122 in the at least one memory 114; the images 122 as stored in the at least one memory 114 may be time stamped.

The cameras 120 are generally understood to be in respective fixed locations at the given location 104, for example mounted to a wall and/or pole, and the like, and may have a fixed field-of-view, or may be configured to pan, track, zoom (e.g., PTZ functionality) and the like at the fixed location. While not depicted, the at least one memory 114 may store identifiers of the cameras 120 in association with their fixed location. In some examples, one or more of the cameras 120 may be integrated with travel check-in devices, for example when the given location 104 comprises an airport, a train station, a bus station, and the like, and such cameras 120 may hence capture time-stamped images of persons checking in to travel using travel services provided at the given location 104, which may be stored at the at least one memory 114. In other examples, one or more of the cameras 120 may be mounted at entrances to the given location 104 to capture images 122 of persons entering the given location 104.

Furthermore, as depicted the camera 120-1 may be positioned to capture one or more images 122-1 of persons 124 who are in a position to view the display screen 112, and the camera 120-2 may be positioned to capture one or more images 122-2 of person 124 who is entering the given location 104 and/or checking at the given location 104.

In general, the computing device 102 may implement the video analytics engine 110 to analyze the live broadcast media 108 and the images 122 to search for POIs (e.g., and/or objects of interest, where such objects are understood to be persons), EOIs, in the live broadcast media 108, and/or analyze the images 122 as described herein. Such analysis may occur using any suitable video analytics parameters including, but not limited to, machine learning classifiers and the like. For example, video analytics parameters provided herein may include one or more of convolutional neural network (CNN) parameters (e.g., CNN layers, for example when the video analytics engine 110 includes a CNN), machine learning classifiers, object recognition confidence thresholds, time-based parameters, object-type parameters, and size-based object parameters. Object-type parameters may include any suitable parameters for detecting given objects, such as the afore mentioned machine learning classifiers and/or CNN parameters and/or layers, and the like. Furthermore, such object-type parameters may include biometric data including, but not limited to, feature vectors, facial landmarks, gait data, and the like, for detecting humans (e.g., and optionally, animals), and the like.

While as depicted the video analytics engine 110 is incorporated with the computing device 102, in other examples, one or more of the cameras 120 may include a respective video analytics engine (e.g., in a system-on-chip architecture) and/or respective video analytics engines may be co-located with one or more of the camera 120 (e.g., as a separate device and/or appliance). In such examples, a portion of analysis of the images 122, described herein with respect to the computing device 102, may occur via respective video analytics located at and/or in one or more of the cameras 120.

As will be described hereafter, the computing device 102 is generally configured (e.g., using the video analytics engine 110) to: analyze the live broadcast media 108 to determine presence of one or more of a POI and an EOI. Determination of a POI and/or EOI will be described in further detail below. However, as depicted, the suspect having the face 118 in the breaking news of the live broadcast media 108-1 (e.g., being analyzed at the computing device 102) may comprise a POI and/or the breaking news itself of the live broadcast media 108-1 may comprise an EOI. Indeed, in this example, the combination of the terms "Breaking News", "WANTED!" and the face 118 of a suspect in the live broadcast media 108-1 may cause the computing device 102 to determine that the live broadcast media 108-1 includes presence of a POI and/or an EOI.

The computing device 102 is further generally configured (e.g., using the video analytics engine 110 and/or data received from respective video analytics devices at and/or in one or more of the cameras 120) to: analyze the one or more images 122 captured by the one or more cameras 120 to determine whether one or more of the POI and the EOI (e.g., identified in the live broadcast media 108-1) meets a condition 126 for causing harm to one or more persons 124 indicated in the one or more images 122.

For example, as depicted, the at least one memory 114 may further store one or more conditions 126, which may include rules and/or data that defines, and/or includes parameters for, causing harm to one or more persons. For example, such conditions 126 may include, but is not limited to, video analytics parameters, machine learning CNN parameters, CNN layers, and the like, adapted for determining whether one or more of the POI and the EOI (e.g., identified in the live broadcast media 108-1) meets a condition 126 for causing harm to one or more persons 124 indicated in the one or more images 122. For example, one condition 126 may include matching a face (e.g., such as the face 118) in live broadcast media 108 with a respective face (e.g., a POI) in the images 122, according to a match threshold, such as 80%, 90%, 95% and/or any other suitable match threshold, using, for example, feature vectors and the like. Another condition 126 may include a rule that associates given events in the live broadcast media 108 with given demographics of the one or persons 124 in the one or more images, such as a natural disaster associated with children of a given age group (e.g., as identified in the images 122 via a CNN layer, and the like).

In response to a POI or the EOI identified in the live broadcast media 108 meeting a condition 126, the computing device 102 may generally change content of the live broadcast media 108 that is being provided at the display screen 112 (and/or the one or more display screens 112). For example, the computing device 102 may control the display screen 112 to switch from showing the first channel of the live broadcast media 108-1 to the second channel of the live broadcast media 108-2 (e.g., presuming any POI and/or EOI of the second channel of the live broadcast media 108-2 does not meet a condition 126). Alternatively, the computing device 102 may cause an image of "Unavailable", and the like, to be provided at the display screen 112 over the live broadcast media 108-1 and/or in place of the live broadcast media 108-1. Indeed, changing content of the live broadcast media 108 is understood to include any suitable action, which changes content being provided at the display screen 112 from live broadcast media 108 to other content (e.g., which also does not meet a condition 126).

Hence, in a particular example, the computing device 102 may determine that the face 118 of the suspect in the live broadcast media 108-1 matches (e.g., meets and/or is greater than a match threshold) a respective face of a person 124 in the images 122 and prevent the "Breaking News" from being provided at the display screen 112. Such an action may prevent harm from being caused to the person 124 at the given location 104 whose face matches the face 118 of the suspect in the live broadcast media 108-1: for example, as other persons 124, seeing the person 124 at the given location 104 whose face matches the face 118 of the suspect in the live broadcast media 108-1, may attempt to restrain them and harm may be caused.

In some examples, the computing device 102 may determining a location (e.g., within the given location 104) of the person 124 whose face matches the face 118, and dispatch security to the location. For example, as depicted, the system 100 further comprises a communication device 128 (e.g., as, depicted, a mobile communication device) operated by security personnel 130 (e.g., a security guard, a police officer, and the like), and the computing device 102 may communicate with the communication device 128 to dispatch the security personnel 130 to the location of the person 124 whose face matches the face 118. The computing device 102 may determine the location of the person 124 whose face matches the face 118 based on video analytics of images 122 that include the person 124, for example relative to other features in the images 122 and/or via a respective location of a camera 120 (e.g., as stored at the at least one memory 114) that captures a live image 122 of the person 124 and/or is currently capturing a live images 122 of the person 124.

Figure 2:
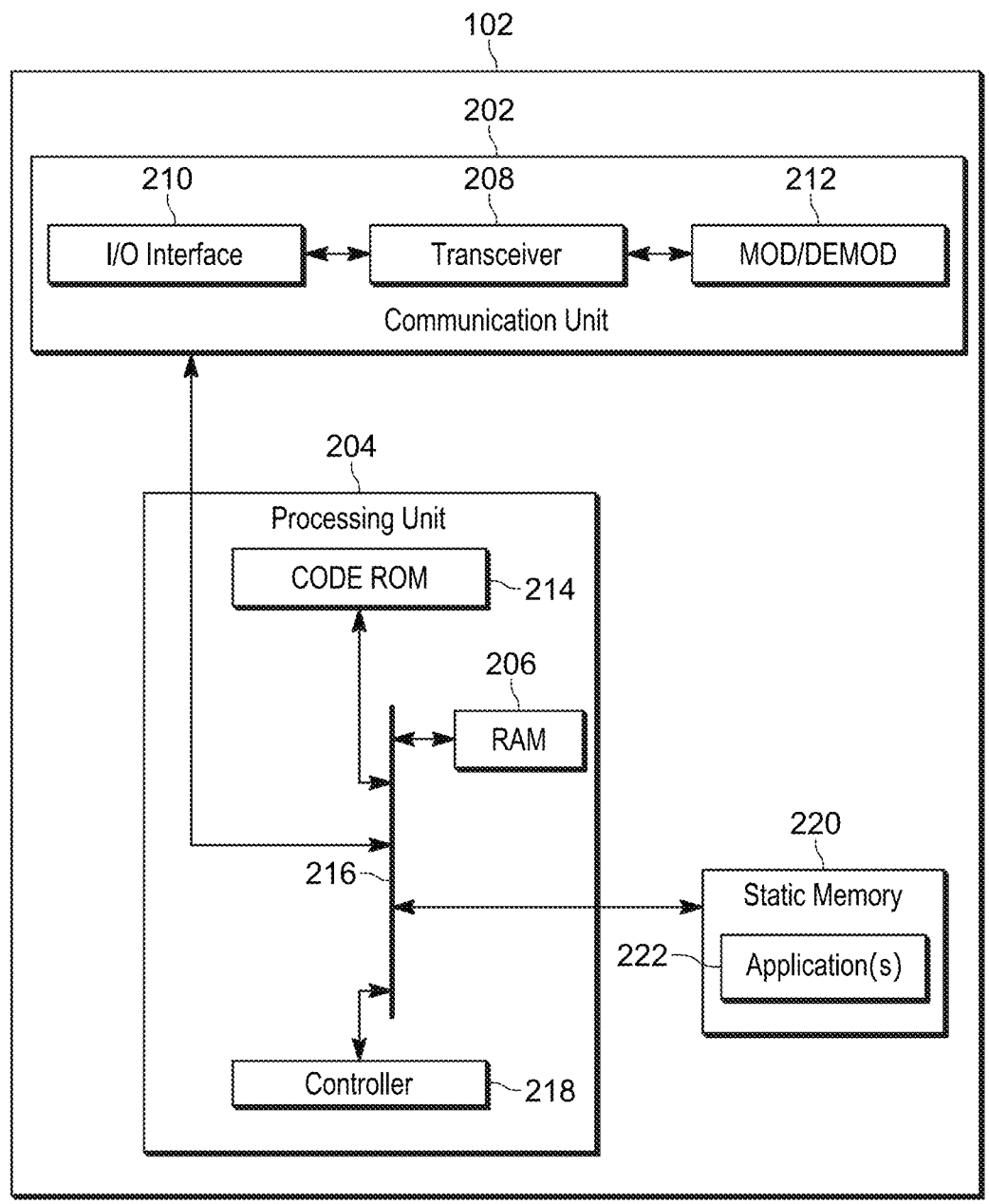
FIG. 2 is a device diagram showing a device structure of a device for changing content of live broadcast media, in accordance with some examples.

Attention is next directed to FIG. 2, which depicts a schematic block diagram of an example of the computing device 102. As depicted, the computing device 102 comprises: a communication unit 202, a processing unit 204, a Random-Access Memory (RAM) 206, one or more wireless transceivers 208 (which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222.

Furthermore, while the memories 206, 214 are depicted as having a particular structure and/or configuration, (e.g., separate RAM 206 and ROM 214), memory of the computing device 102 may have any suitable structure and/or configuration.

While not depicted, the computing device 102 may include one or more of an input component and a display screen (e.g., different from the display screen 112) and the like.

As shown in FIG. 2, the computing device 102 includes the communication unit 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication unit 202 may include one or more wired and/or wireless input/output (I/O) interfaces 210 that are configurable to communicate with other components of the system 100. For example, the communication unit 202 may include one or more transceivers 208 and/or wireless transceivers for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network.

In particular examples, a cell phone transceiver, a DMR transceiver, P25 transceiver, and/or a TETRA transceiver may be used to communicate with the communication device 128 of the security personnel 130. In other particular examples, any of the wireless transceivers 208 and/or the wireline transceivers 208 may be used to communicate with the other components of the system 100. However, any suitable transceiver 208 may be used to communicate with any other suitable component of the system 100.

The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality for changing content of live broadcast media. For example, in some examples, the computing device 102 and/or the controller 218 specifically comprises a computer executable engine configured to implement functionality for changing content of live broadcast media.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the computing device 102 as described herein are maintained, persistently, at the memory 220 and used by the controller 218, which makes appropriate utilization of volatile storage during the execution of such programming instructions.

In some examples, the memory 220 may further be combined, and/or partially combined, with the at least one memory 114 and/or one or more of the schedule 116, the images 122 and/or the conditions 126 may be stored at the memory 220.

Figure 3:
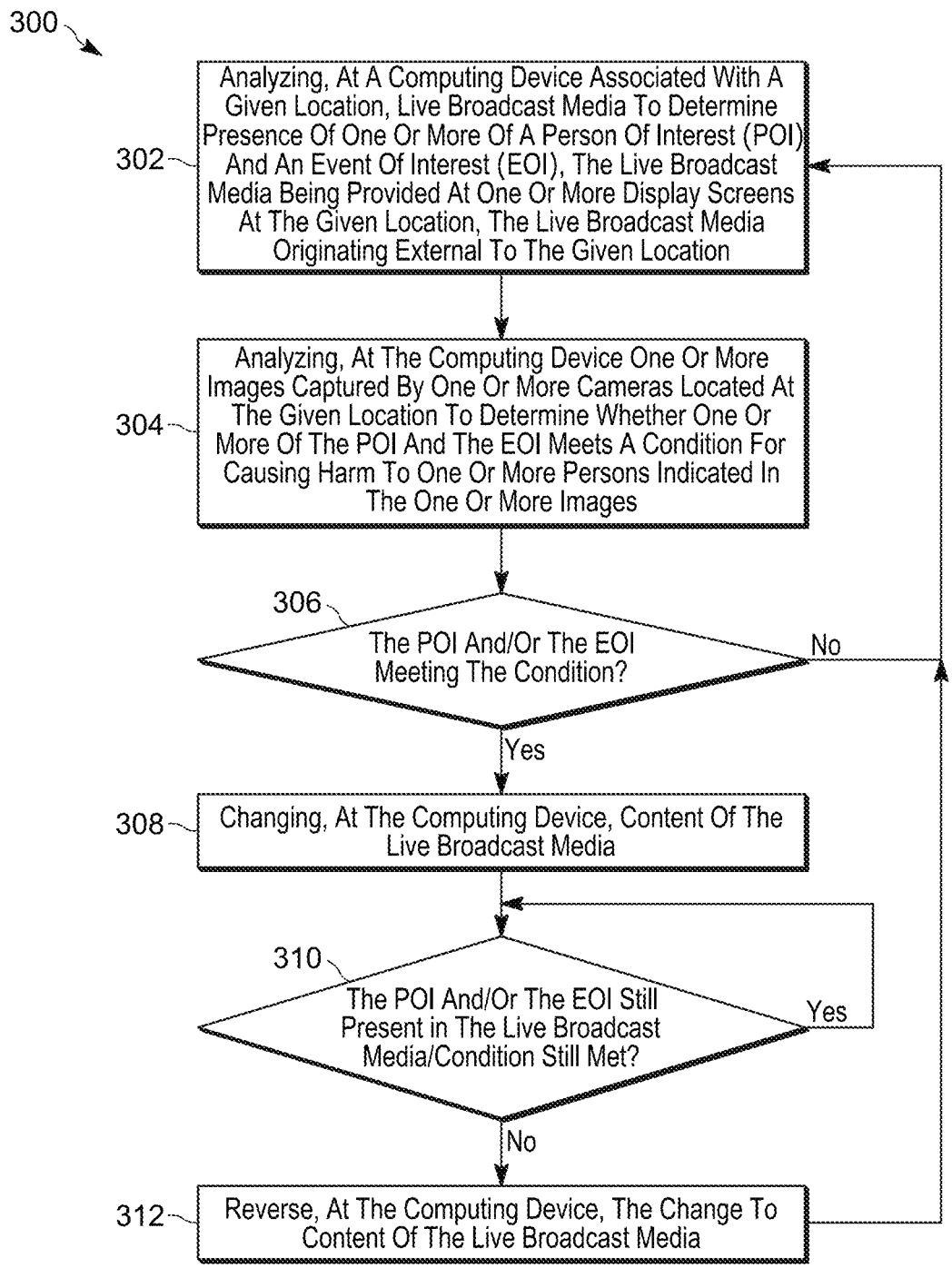
FIG. 3 is a flowchart of a method for changing content of live broadcast media, in accordance with some examples.

In particular, the memory 220 stores instructions corresponding to the at least one application 222 that, when executed by the controller 218, enables the controller 218 to implement functionality for changing content of live broadcast media, including but not limited to, the blocks of the methods set forth in FIG. 3.

In illustrated examples, when the controller 218 executes the one or more applications 222, the controller 218 is enabled to: analyze live broadcast media to determine presence of one or more of a POI and an EOI, the live broadcast media being provided at one or more display screens at a given location, the live broadcast media originating external to the given location; analyze one or more images captured by one or more cameras located at the given location to determine whether one or more of the POI and the EOI meets a condition for causing harm to one or more persons indicated in the one or more images; and responsive to the POI or the EOI meeting the condition, change content of the live broadcast media.

The application 222 may include programmatic algorithms, and the like, to implement functionality as described herein.

Alternatively, and/or in addition to programmatic algorithms, the application 222 may include one or more machine learning algorithms to implement functionality as described herein. The one or more machine learning algorithms of the application 222 may include, but are not limited to: a deep-learning based algorithm; a neural network (e.g., a convolutional neural network); a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. Any suitable machine learning algorithm and/or deep learning algorithm and/or neural network is within the scope of present examples.

Furthermore, the computing device 102 may be operated in a learning mode to provide feedback to the one or more machine learning algorithms and/or CNNs thereof, to better "teach" the one or more machine learning algorithms and/or CNNs thereof to one or more of: analyze live broadcast media to determine presence of one or more of a POI and an EOI; and analyze one or more images captured by one or more cameras determine whether one or more of the POI and the EOI meets a condition for causing harm to one or more persons indicated in the one or more images. For example, screen captures from live broadcast media that include a POI and/or an EOI may be provided to the computing device 102 in the learning mode; and/or screen captures from live broadcast media that include a POI and/or an EOI that meet a condition for causing harm to one or more persons indicated in the one or more images may be provided to the computing device 102 in the learning mode, along with the images that include the one or more persons.

Attention is now directed to FIG. 3, which depicts a flowchart representative of a method 300 for changing content of live broadcast media. The operations of the method 300 of FIG. 3 correspond to machine readable instructions that are executed by the computing device 102, and specifically the controller 218 of the computing device 102. In the illustrated example, the instructions represented by the blocks of FIG. 3 are stored at the memory 220 for example, as the application 222. The method 300 of FIG. 3 is one way in which the controller 218 and/or the computing device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

Furthermore, while the method 300 is being described with respect to analyzing the live broadcast media 108-1 provided at the display screen 112, it is understood that the method 300 may be applied to any suitable live broadcast media 108 that is being provided at any of one or more display screens 112 at the given location 104.

At a block 302, the controller 218 and/or the computing device 102 (e.g., associated with the given location 104), analyzes the live broadcast media 108-1 to determine presence of one or more of a POI and an EOI, the live broadcast media 108-1 being provided at one or more display screens 112 at the given location 104, the live broadcast media 108-1 originating external to the given location 104 (e.g., from the broadcast device 106-1).

A person of interest may comprise a person wanted for a crime whose face is being shown in the live broadcast media 108-1, such as the person having the face 118. However, the person of interest may comprise any other suitable person of interest in the live broadcast media 108-1 that may meet a condition 126 for causing harm to one or more persons 124 (e.g., at the given location 104) indicated in the one or more images 122. For example the live broadcast media 108-1 may include a report of a celebrity involved in a scandal and the like, and a person 124 at the given location 104, who looks like the celebrity, may be mobbed by reporters and/or autograph seekers, and potentially harmed. Hence, such a celebrity in the live broadcast media 108-1 may also be a POI whose presence in the live broadcast media 108-1 is determined by the computing device 102.

An event of interest may comprise any suitable event of interest that may meet a condition 126 for causing harm to one or more persons 124 (e.g., at the given location 104) indicated in the one or more images 122. For example, as has been previously mentioned, a natural disaster may comprise an event of interest. Similarly, a natural disaster that includes graphic and/or violent scenes in the live broadcast media 108-1 may comprise an event of interest. In another example, an event of interest may comprise a sporting event in which a team wins or loses, and which may incite persons 124 who are fans of the team to getting excited and cause harm to each other or other persons 124 (e.g., fans of an opposing team); such fans in the images 122 may be identified via clothing, hats, and the like, having a logo and/or name of a tram and/or an opposing team.

In some examples, the controller 218 and/or the computing device 102 may analyze the live broadcast media 108-1 as the live broadcast media 108-1 is received (e.g., without regard to the schedule 116).

However, in other examples, to reduce use of processing resources at the computing device 102, the controller 218 and/or the computing device 102 may analyze the live broadcast media 108-1 according to the schedule 116 of the live broadcast media 108-1. For example, analyzing the live broadcast media 108-1 may occur according to the schedule 116 of the live broadcast media 108-1 such that the analyzing occurs only when given types of content and/or shows are scheduled to be broadcast, such as news content and/or news shows, and/or sports content and/or sports shows. For example such given types of content and/or shows may be more likely to include persons of interest and/or events of interest than other types of content and/or shows. Hence the controller 218 and/or the computing device 102 may analyze the live broadcast media 108-1 only while given types of content and/or shows are being provided in the live broadcast media 108-1. Indeed, the computing device 102 may have access to a list of given content types and/or given how types, during which the analyzing of the live broadcast media 108-1 is to occur (e.g., as provided by an administrator of the system 100 and/or as determined via machine learning algorithms, and the like). As such, the computing device 102 may analyze the schedule 116 to determine when such content types and/or show types are scheduled, and analyze the live broadcast media 108-1 for presence of a POI and/or an EOI when (and/or only when) such content types and/or show types are scheduled.

However, in other examples, the controller 218 and/or the computing device 102 may analyze the live broadcast media 108-1 to determine presence of an interruption to normal scheduling of the live broadcast media 108-1, for example to determine when breaking news, and the like, interrupts normal scheduling of the live broadcast media 108. In response to such an interruption, the computing device 102 may analyze the live broadcast media 108-1 for presence of a POI and/or an EOI. Hence, in these examples, analyzing the live broadcast media 108-1 for presence of a POI and/or an EOI that may occur according to the schedule 116, as described above; and outside of such time periods, the controller 218 and/or the computing device 102 may analyze the live broadcast media 108-1 to determine presence of an interruption to normal scheduling and also perform the analyzing the live broadcast media 108-1 for presence of a POI and/or an EOI during such interruptions.

At a block 304, the controller 218 and/or the computing device 102 analyzes one or more images 122 captured by the one or more cameras 120 located at the given location 104 to determine, at a block 306, whether one or more of the POI and the EOI meets a condition 126 for causing harm to one or more persons 124 indicated in the one or more images 122.

For example, analyzing the live broadcast media 108-1 at the block 302 may comprise identifying a face of the POI in the live broadcast media 108-1 (e.g., the face 118), and the condition 126 for causing harm to the one or more persons 124 indicated in the one or images 122 may comprises a respective face in the one or images 122 meeting a match threshold with the face in the live broadcast media 108-1, as determined using feature vectors, and the like.

In other examples, a condition 126 for causing harm to one or more persons 124 indicated in the one or more images 122 may comprises features associated with the one or persons 124 in the one or more images 122 meeting a match threshold with one or more of objects and faces in the live broadcast media 108-1. In some of these examples, a POI of the live broadcast media 108-1 may comprise a wanted suspect and/or a celebrity, and the like, and the features of faces of one or persons 124 in the one or more images 122 may meet a match threshold with a face of the wanted suspect and/or the celebrity, and the like. In other examples, an EOI of the live broadcast media 108-1 may comprise a sporting event, and the like, and the features of the one or persons 124 in the one or more images 122 may comprise sports logos that may meet a match threshold with sports logos of the sporting event of the live broadcast media 108-1, and the like.

In further examples, a condition 126 for causing harm to one or more persons 124 indicated in the one or more images 122 may comprise a rule that associates given events of the live broadcast media 108-1 with given demographics of the one or persons 124 in the one or more images 122, such as an association between a natural disaster and children of a given age group. However, any association between any suitable given event and any suitable given demographics is within the scope of the present specification. For example specific given event types may be associated with one or more of respective age groups, respective genders, and the like. For example, given demographics may include, but are not limited to, age, gender, region of origin (e.g., neighborhood, city, county, state, country, and the like), and the like.

Responsive to the POI or the EOI not meeting a condition 126 (e.g., a "NO" decision at the block 306), the controller 218 and/or the computing device 102 continues to analyze the live broadcast media 108-1 at the block 302.

However, responsive to the POI or the EOI meeting the condition 126 (e.g., a "YES" decision at the block 306), at a block 308, the controller 218 and/or the computing device 102 changes content of the live broadcast media 108-1.

In some examples, changing content of the live broadcast media 108-1 may comprise replacing the POI or the EOI with other content at the one or more display screens 112. For example, with brief reference to FIG. 1, instead of showing, at the display screens 112, the live broadcast media 108-1 that includes the breaking news with the POI having the face 118, the computing device 102 may replace the live broadcast media 108-1 that includes the POI with a notice (e.g., an image) indicating that the live broadcast media is "Unavailable", and the like. Alternatively, the face 118 may be blurred out, and the like.

In other examples, changing content of the live broadcast media 108-1 may comprise replacing the live broadcast media 108-1 with other live broadcast media 108 at the one or more display screens 112. Such other live broadcast media 108 may include, but is not limited to, previously recorded live broadcast media 108; for example, the computing device 102 may record live broadcast media 108 and store the recorded live broadcast media 108 at the at least one memory 114, and retrieve previously recorded live broadcast media 108 to use in place of the live broadcast media 108-1 that includes a POI and/or an EOI that meets a condition 126. In some examples, such other live broadcast media 108 may include live broadcast media 108 of a channel different from the first channel of the live broadcast media 108-1 that is being changed.

For example, changing content of the live broadcast media 108-1 may comprise switching from a first channel, on which the live broadcast media 108-1 is received, to a second channel, on which the other live broadcast media 108 is received. For example, the controller 218 and/or the computing device 102 may replace, at the one or more display screens 112, the first channel, of the live broadcast media 108-1, with the second channel of the live broadcast media 108-2 from the broadcasting device 106-2.

It is understood, however, that in examples where changing content of the live broadcast media 108-1 comprises changing to other live broadcast media 108 (e.g., either prerecorded or on another channel), such other live broadcast media 108 may also analyzed by the controller 218 and/or the computing device 102 to ensure that a respective POI and/or a respective EOI of such other live broadcast media 108 does not meet a condition 126.

Put another way, changing content of the live broadcast media 108-1 may comprise: replacing the POI or the EOI with other content at the one or more display screens 112; replacing the live broadcast media 108-1 with other live broadcast media 108 at the one or more display screens 112; switching from a first channel, on which the live broadcast media 108-2 is received, to a second channel, on which the other live broadcast media 108 is received; and the like.

In some examples, as depicted, at an optional block 310, the controller 218 and/or the computing device 102 determines whether the POI or the EOI of the live broadcast media 108-1 are still present and/or whether the condition 126 that was met at the block 306 is still met by the POI or the EOI of the live broadcast media 108-1 is still met.

The block 310 may continue in a loop (e.g., when "YES" decisions occur at the block 310) while the POI or the EOI is still present at the live broadcast media 108-1 and/or while the condition 126 of the block 306 is still being met.

However, responsive to the POI or the EOI of the live broadcast media 108-1 no longer being present at the live broadcast media 108-1, and/or the condition 126 (that as met at the block 306) no longer being met, (e.g., a "NO" decision at the block 310), at a block 312, the controller 218 and/or the computing device 102 reverses the change to the content of the live broadcast media 108-1 that was made at the block 308. For example, the controller 218 and/or the computing device 102 may remove a notice of "Unavailable" from the display screens 112, and/or the controller 218 and/or the computing device 102 may return to providing the live broadcast media 108-1 to the one or more display screens 112, and/or the controller 218 and/or the computing device 102 may switch back to the first channel from the second channel.

After the block 312, the controller 218 and/or the computing device 102 continues to analyze the live broadcast media 108-1 at the block 302.

Alternatively, rather than implement the block 310, the controller 218 and/or the computing device 102 may reverse (e.g., at the block 312) the change to the content of the live broadcast media 108-1 that was made at the block 308 after a given time period.

Alternatively, where changing the content of the live broadcast media 108-1 at the block 308 comprises changing channels for example to the live broadcast media 108-2, after the block 308, the controller 218 and/or the computing device 102 analyzes the live broadcast media 108-2 at the block 302 and the method 300 repeats.

The method 300 may include other suitable features.

For example, the controller 218 and/or the computing device 102, having identified a POI of the live broadcast media 108-1, may determine whether a person 124 having matching facial features (e.g., according a match threshold) has entered the given location 104, and/or has checked in using a travel check-in device, using stored images 122 from the camera 120-2, and the like. When no person 124 having matching facial feature has entered the given location 104 and/or checked in, the controller 218 and/or the computing device 102 may not analyze live images 122 and the controller 218 and/or the computing device 102 may continue implementing the block 302. However, when a person 124 having matching facial feature has entered the given location 104 and/or checked in, the controller 218 and/or the computing device 102 may analyze live images 122 at the block 304 and otherwise continue with the method 300.

Furthermore, in some examples, the controller 218 and/or the computing device 102 may implement the block 304, but only for images 122 received from cameras 120 that capture images 122 of persons that may be positioned to view display screens 112.

In other examples, as described with respect to FIG. 1, the controller 218 and/or the computing device 102 may introduce a delay (e.g., a time delay) in providing the live broadcast media 108-2 at the one or more display screens 112, prior to analyzing the live broadcast media 108-1. In these examples, changing content of the live broadcast media 108-1 at the block 310 may comprise replacing the POI and/or the EOI with other content at the one or more display screens 112 prior to the live broadcast media 108-1 that includes the POI and/or the EOI being provided at the one or more display screens 112.

However, in other examples, the controller 218 and/or the computing device 102 may not introduce a delay in providing the live broadcast media 108-2 at the one or more display screens 112 and the controller 218 and/or the computing device 102 may analyze the live broadcast media 108-1 as it is both received and provided at the one or more display screens 112.

In some examples, the method 300 may further include the controller 218 and/or the computing device 102: responsive to one or more of the POI and the EOI meeting (e.g., at the block 308) a condition 126 for causing harm to one or more persons 124 indicated in the one or more images 122, dispatching security to a location of the one or more persons 124 indicated in the one or more of the images 122. For example, a location of one or more persons 124 indicated in one or more of the images 122 may be determined using a stored association between a fixed location of a camera 120 that captured images 122 of such persons 124, and/or using video analysis to determine identifiable features and/or object in the images 122 that are associated with a location (e.g., and such associations may be stored at the at least one memory 114).

In a particular example, the controller 218 and/or the computing device 102 may transmit the location of one or more persons 124 to the communication device 128 with a message that includes a command, and the like, that the security personnel 130 go to the location to, for example detain and/or protect the one or more persons 124. Such a message may include a screen capture and/or an image of the face 118 (e.g., extracted from the live broadcast media 108-1), and/or such a message may include an image 122 that includes the one or more persons 124 that caused a condition 126 to be met at the block 304 and/or the block 306. In a particular example, detention may occur when a person 124 actually is a wanted suspect, for example when the security personnel 130 positively identifies a wanted suspect; alternatively, the security personnel 130 may determine that a person 124 is not a wanted suspect and may offer to assist them.

In yet further examples, the computing device 102 may analyze stored images 122, and/or live images 122, to track a path of a person 124 through the given location 104. For example, when person 124 comprises a wanted suspect, a path of the person 124, and/or images 122 of the person 124, may assist with a determination of their behavior (e.g., whether or not they are acting suspiciously), and which may assist the security personnel 130 in determining whether to detain them or not. Such a determination of suspicious behavior may occur via the computing device 102 analyzing the images 122 using a machine learning algorithm trained to determine suspicious behavior and/or by the computing device 102 providing images 122 showing the person 124 to the communication device 128 for review by the security personnel 130.

In another particular example, the method 300 may further comprise the controller 218 and/or the computing device 102: analyzing one or more stored images 122 from the one or more cameras 120 to determine previous presence of a face (e.g., the face 118) of the POI in the stored images 122 determined according to a match threshold; analyzing the one or more images 122 to determine that a respective face in the one or more images 122 meets the match threshold with the face (e.g., the face 118) in the live broadcast media 108-1, a condition 126 for causing harm to the one or more persons 124 indicated in the one or more images 122 comprising the respective face in the one or more images 122 meeting the match threshold with the face in the live broadcast media 108-1; determining a location of the respective face at the given location 104; and dispatching security to the location. Hence, in this example, stored images 122 from the at least one memory 114 showing presence of a person 124, entering and/or checking in at the given location 104, that has a face that matches (e.g., according to a match threshold) a face of a POI of the live broadcast media 108-1 may be used to trigger the analysis of the block 304 using live images 122 from the cameras 120, as well as cause security to be dispatched to a location where the person 124 is determined to be located (e.g., using the live images 122).

Figure 4:
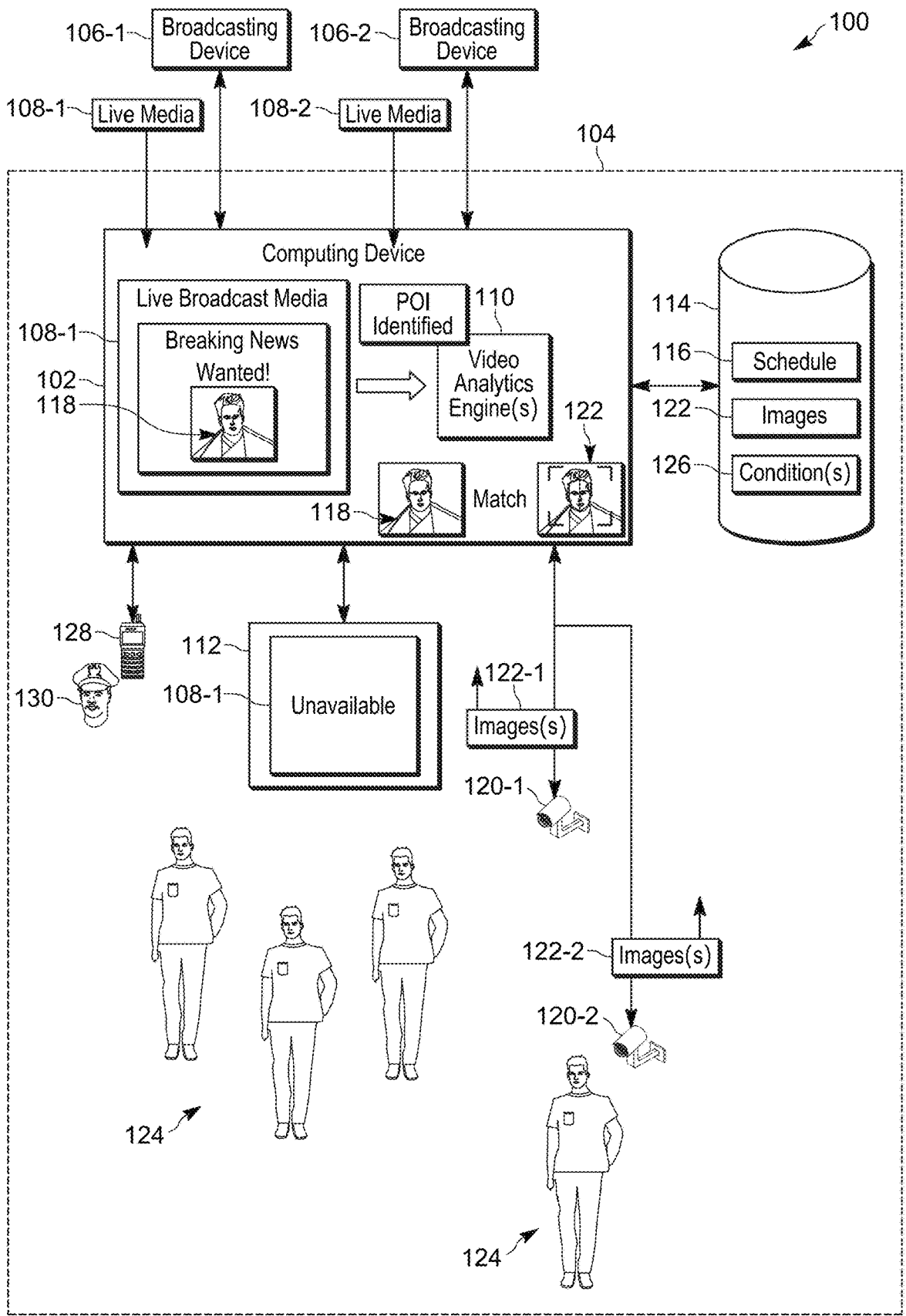
FIG. 4 depicts the system of FIG. 1 implementing a method for changing content of live broadcast media, in accordance with some examples.
Figure 5:
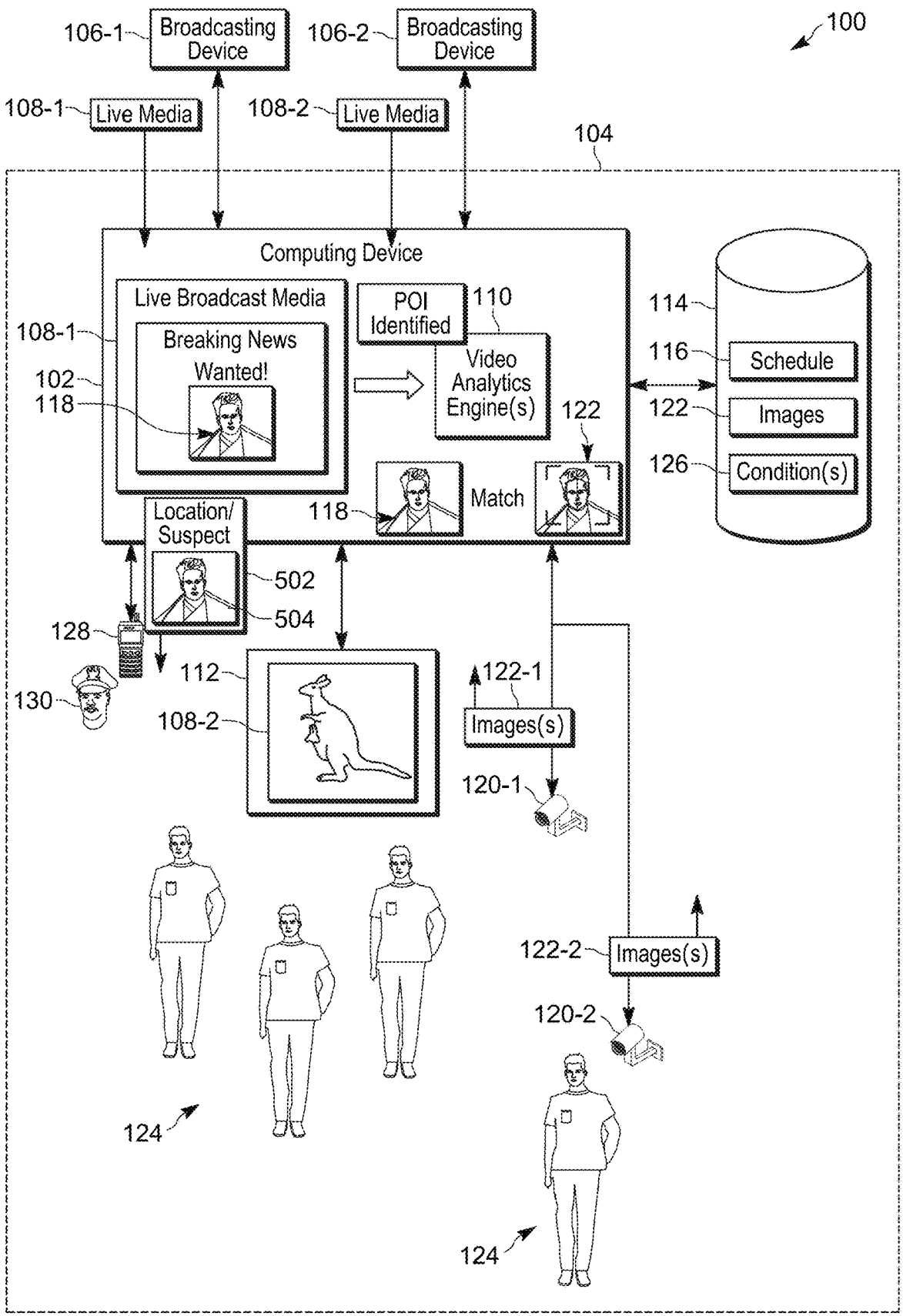
FIG. 5 depicts the system of FIG. 1 continuing to implement the method for changing content of live broadcast media, in accordance with some examples.

Attention is next directed to FIG. 4 and FIG. 5, which depicts various aspects and/or examples of the method 300. FIG. 4 and FIG. 5 are substantially similar to FIG. 1, with like components having like numbers. Furthermore, each of FIG. 4 and FIG. 5 are understood to follow FIG. 1 in time.

In one example of the method 300, FIG. 4 depicts the computing device 102, determining, via the video analytics engine 110 (e.g., at the block 302 of the method 300), that the live broadcast media 108-1 includes a POI, in particular a wanted suspect having the face 118. Such a determination is indicated in FIG. 4 via "POI IDENTIFIED" at the video analytics engine 110. Furthermore, FIG. 4 depicts the computing device 102 determining (e.g., at the block 304) that an image 122, from one or more of the cameras 120, includes a face that matches the face 118 of the POI. As such, the computing device 102 determines that a condition 126 has been met (e.g., at the block 306 of the method 300). Such a determination is indicated in FIG. 4 via the term "MATCH" at the computing device 102 between the face 118 and image 122 being analyzed. As such, the computing device 102 determines that a condition 126 has been met (e.g., at the block 306 of the method 300). Hence, rather than provide the live broadcast media 108-1 that includes the face 118 to the display screen 112, the computing device 102 changes (e.g., at the block 308 of the method 300) the live broadcast media 108-1 to cover, and/or replace, the live broadcast media 108-1 that includes the face 118, at the display screen 112, with a notice that the live broadcast media 108-1 is "Unavailable". It is understood that the computing device 102, when the face 118 is no longer in the live broadcast media 108-1, may remove the notice and continue to provide the live broadcast media 108-1 at the display screen 112.

In another example of the method 300, FIG. 5 depicts the computing device 102, determining, via the video analytics engine 110 (e.g., at the block 302 of the method 300), that the live broadcast media 108-1 includes a POI, in particular a wanted suspect having the face 118. Such a determination is indicated in FIG. 5 via "POI IDENTIFIED" at the video analytics engine 110. Furthermore, FIG. 5 depicts the computing device 102 determining (e.g., at the block 304) that an image 122, from one or more of the cameras 120, includes a face that matches the face 118 of the POI. As such, the computing device 102 determines that a condition 126 has been met (e.g., at the block 306 of the method 300). Such a determination is indicated in FIG. 5 via the term "MATCH" at the computing device 102 between the face 118 and image 122 being analyzed. As such, the computing device 102 determines that a condition 126 has been met (e.g., at the block 306 of the method 300). Hence, rather than provide the live broadcast media 108-1 that includes the face 118 to the display screen 112, the computing device 102 changes (e.g., at the block 308 of the method 300) from a first channel of the live broadcast media 108-1 to a second channel of the live broadcast media 108-2 (e.g., which, as depicted, is providing a nature show). It is understood that the computing device 102, when the face 118 is no longer in the live broadcast media 108-1 may continue to provide the second channel of the live broadcast media 108-2 at the display screen 112, or switch back to the first channel of the live broadcast media 108-1.

Also depicted in FIG. 5, the computing device 102 transmits a message 502 to the communication device 128 that includes a location of the person 124 whose face matches the face 118 of the POI, to dispatch the security personnel 130 to the location (the location determined by the computing device 102 as previously described herein). As depicted, the message 502 includes an image 504 of the POI from the live broadcast media 108-1 to assist the security personnel 130 with finding the person 124 whose face matches the face 118 of the POI. Alternatively, or in addition, the message 502 may include an image of the person 124 whose face matches the face 118 of the POI (e.g., in the form of the image 122 that was matched to the face 118 and/or a portion thereof that includes the face of the person 124). The message 502 may alternatively include an indication of whether or not the person 124 whose face matches the face 118 of the POI is acting suspiciously, and/or map showing their path through the given location 104. Transmission of the message 502 may also occur in the example of FIG. 4.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot receive live broadcast media and nor receive images from cameras and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
analyzing, at a computing device associated with a given location, live broadcast media to determine presence of one or more of a person of interest (POI) and an event of interest (EOI), the live broadcast media being provided at one or more display screens at the given location, the live broadcast media originating external to the given location;
analyzing, at the computing device, one or more images captured by one or more cameras located at the given location to determine whether one or more of the POI and the EOI meets a condition for causing harm to one or more persons indicated in the one or more images; and
responsive to the POI or the EOI meeting the condition, changing, at the computing device, content of the live broadcast media,
wherein the analyzing the live broadcast media comprises identifying a face of the POI in the live broadcast media, and the condition for causing harm to the one or more persons indicated in the one or images comprises a respective face in the one or images meeting a match threshold with the face in the live broadcast media.

2. The method of claim 1, further comprising:
analyzing one or more stored images from the one or more cameras to determine previous presence of a face of the POI in the stored images determined according to the match threshold;
analyzing the one or more images to determine that a respective face in the one or more images meets the match threshold with the face in the live broadcast media,
determining a location of the respective face at the given location; and
dispatching security to the location.

3. The method of claim 1, wherein the condition for causing harm to the one or more persons indicated in the one or more images further comprises features associated with the one or persons in the one or more images meeting the match threshold with one or more of objects and faces in the live broadcast media.

4. The method of claim 1, wherein the condition for causing harm to the one or more persons indicated in the one or more images further comprises a rule that associates given events in the live broadcast media with given demographics of the one or persons in the one or more images.

5. The method of claim 1, further comprising introducing a delay in providing the live broadcast media at the one or more display screens, prior to analyzing the live broadcast media, and
wherein changing content of the live broadcast media comprises replacing the POI or the EOI with other content at the one or more display screens prior to the live broadcast media being provided at the one or more display screens.

6. The method of claim 1, wherein changing content of the live broadcast media comprises:
replacing the POI or the EOI with other content at the one or more display screens;
replacing the live broadcast media with other live broadcast media at the one or more display screens; or
switching from a first channel, on which the live broadcast media is received, to a second channel, on which the other live broadcast media is received.

7. The method of claim 1, further comprising, responsive to one or more of the POI and the EOI meeting the condition, dispatching security to a location of the one or more persons indicated in one or more of the images.

8. The method of claim 1, wherein the analyzing the live broadcast media occurs according to a schedule of the live broadcast media.

9. The method of claim 1, wherein the analyzing the live broadcast media comprises determining presence of an interruption to normal scheduling of the live broadcast media to provide one or more of the POI and the EOI.

10. A device associated with a given location, the device comprising:
a communication unit; and
a controller configured to:
analyze live broadcast media, received via the communication unit, to determine presence of one or more of a person of interest (POI) and an event of interest (EOI), the live broadcast media being provided at one or more display screens at the given location, the live broadcast media originating external to the given location; analyze one or more images, received via the communication unit, captured by one or more cameras located at the given location to determine whether one or more of the POI and the EOI meets a condition for causing harm to one or more persons indicated in the one or more images; and
responsive to the POI or the EOI meeting the condition, change content of the live broadcast media,
wherein the controller is further configured to analyze the live broadcast media by identifying a face of the POI in the live broadcast media, and the condition for causing harm to the one or more persons indicated in the one or images comprises a respective face in the one or images meeting a match threshold with the face in the live broadcast media.

11. The device of claim 10, wherein the controller is further configured to:
analyze one or more stored images from the one or more cameras to determine previous presence of a face of the POI in the stored images determined according to the match threshold;
analyze the one or more images to determine that a respective face in the one or more images meets the match threshold with the face in the live broadcast media;
determine a location of the respective face at the given location; and
dispatch security to the location.

12. The device of claim 10, wherein the condition for causing harm to the one or more persons indicated in the one or more images further comprises features associated with the one or persons in the one or more images meeting the match threshold with one or more of objects and faces in the live broadcast media.

13. The device of claim 10, wherein the condition for causing harm to the one or more persons indicated in the one or more images further comprises a rule that associates given events in the live broadcast media with given demographics of the one or persons in the one or more images.

14. The device of claim 10, wherein the controller is further configured to introduce a delay in providing the live broadcast media at the one or more display screens, prior to analyzing the live broadcast media, and
wherein the controller is further configured to change content of the live broadcast media by replacing the POI or the EOI with other content at the one or more display screens prior to the live broadcast media being provided at the one or more display screens.

15. The device of claim 10, wherein the controller is further configured to change content of the live broadcast media by:
replacing the POI or the EOI with other content at the one or more display screens;
replacing the live broadcast media with other live broadcast media at the one or more display screens; or
switching from a first channel, on which the live broadcast media is received, to a second channel, on which the other live broadcast media is received.

16. The device of claim 10, wherein the controller is further configured to, responsive to one or more of the POI and the EOI meeting the condition, dispatch security to a location of the one or more persons indicated in one or more of the images.

17. The device of claim 10, wherein the controller is further configured to analyze the live broadcast media according to a schedule of the live broadcast media.

18. The device of claim 10, wherein the controller is further configured to analyze the live broadcast media by determining presence of an interruption to normal scheduling of the live broadcast media to provide one or more of the POI and the EOI.

* * * * *